Patented Nov. 1, 1938

2,135,429

UNITED STATES PATENT OFFICE 2,135,429

METHOD OF PRODUCING A TILE BASE

Frank W. Corkery, Crafton, Pa.

No Drawing. Application June 18, 1937,
Serial No. 148,961

6 Claims. (Cl. 196—13)

This invention relates to the purification of a still residue of particular sort, and to the blending of purified and unpurified still residue of that sort, to provide a resin of intermediate purity useful for certain purposes.

The still residue with which I am concerned is a substance residually produced in the fractionation and purification treatments of the light oil recovered in the by-product coking of coal. This light oil comes over in coal distillation. By far the greatest proportion of the light oil distills over before tar in by-product coking, and is recovered from the gases with which it comes over by being absorbed in a scrubbing oil, which scrubbing oil is usually a heavy cut of petroleum. This still residue contains polymers of resin-forming bodies in various stages of polymerization, some heavy monomers, traces of naphthalene, and various percentages of sulphates and sulphonates. It is a dark, viscous, oily substance deficient in drying qualities, and itself possessing but little utility in the arts. As it is commercially available, the still residue may be obtained from either of the following operations conducted upon the light oil.

Briefly to discuss the still residue from which dipolymer oil may be obtained, such still residue may be produced from the fractionation of light oil in initial, or "crude," stills; may be obtained as a residue of distillation after acid purification and neutralization of the light oil or light oil fractions; or may be obtained as bottoms in the stills by which a fractionation into No. 1 crude solvent naphtha (xylol) and No. 2 crude heavy solvent naphtha is effected. It is usually a mixture from all these sources, and is in degree contaminated by sulphates and sulphonates. The various still residues, because of the heat treatment, or acid purification treatment, or both of such treatments, to which the light oil is subjected, comprise a large percentage of polymers of the light oil unsaturates, such as coumarone, indene and strene, in varying proportions. Usually the still residue is subjected in the by-product plant to a distillation for the removal of solvents and naphthalene. There is variation in the above-noted practice in different coking plants. Light oil is in some plants additionally recovered by distillation of the tar in which it is entrapped, not all of the light oil coming over during the initial distillation. This fraction of light oil recovered from the tar is contaminated with phenols, pyridine bases, and other typical tar ingredients, which however, are removed by a preliminary purification prior to the several typical fractionating and purifying treatments given above to which the light oil is subjected. The residues with which I deal may be considered, for all practical purposes, as free from tar ingredients, even though derived, or partially derived, by the distillation of tar.

As still residue of this sort is commonly available commercially, it contains sulphonates from the acid purification and neutralization of the light oil, followed by the distillation in the "pure stills" which results in the production of a residue. These sulphonates appear to be in the form of the alkaline and alkaline earth salts of sulphonates of light oil aromatics.

Assuming that the starting material is a still residue containing sulphonates, a solid resinous material may be obtained from the still residue by distillation, which distillation may be either straight distillation, vacuum distillation, steam distillation, or a steam and vacuum distillation. In distilling, the temperature of distillation is carried to such point, and distillation is continued for such time that there is distilled off the coal tar solvent content of the still residue, and all other of the more volatile ingredients, thus leaving resin and sulphonates in intimately commingled condition. I have found a still temperature of 550° F., when distillation is conducted with steam and under vacuum of about 20 inches of mercury, adequate to obtain distillation to a point at which a residual resin-sulphonate is obtained. At atmospheric pressure and without the use of steam I have found adequate for distillation a still temperature of 575° F., or slightly lower.

If such distillation be conducted upon a still residue of the sort above described, which is not subjected to initial purification, the resultant solid product, or resin-sulphonate, is a dark brown to blackish material, which differs definitely in important characteristics from a coumarone type resin which does not contain sulphonates. It has an ability to resist flowing when raised to its softening temperature, possessing a high viscosity at such temperatures. When distillation is carried to a point at which all of the dipolymer oil is driven off, and the material recovered as solid resin, this solid resin-sulphonate has a melting-point of approximately 125° C. (ball and ring method). The color depth is about 17 or 18 on the coal tar resin color scale.

While usable for some purposes, this resin-sulphonate, obtained as the solid residuum from the distillation of unpurified still residue, has qualities which render it unsuitable for many purposes, amongst which is use as the resin content of a binder composition for mastic tile, linoleum, or the like. This is for the reason that its penetration at 115° F. (the standard upper temperature for determining penetration in mastic tile binder materials), is so high that it is difficult to combine with it in a tile binder sufficient plasticizer to give the binder composition adequate penetration at 77° F. without rendering its penetration at 115° F. too high.

Assuming that the still residue contains a content of sulphonates which may be considered average for a mixture of still residue from the various stills involved in the fractionating and purification of the light oil, such average sulphonate content may be considered as an initial content of about 14% the weight of the liquid still residue, and a content of approximately 30% to 40% the weight of the solid resin-sulphonate obtained by the distillation. It will thus be seen that if this solid product from unpurified still residue be combined with a plasticizer, such as animal, vegetable, or marine pitch, or synthetic pitch, in a proportion of 70% of the resinous material to 30% of the plasticizer to form a tile binder, the sulphonate content of the tile binder will be approximately 25% of the whole. Such sulphonate content gives the material a penetration at 115° F. so high as, in practical effect, to inhibit its use as a component of a tile binder.

For this and other purposes it is important that the sulphonate content of the residuum be removed or proportionally reduced. My preferred method of purifying still residue of its sulphonate content is disclosed in my co-pending application Serial No. 131,182, filed March 16, 1937, which is directed particularly to the recovery of sulphonate sludge from the still residue. A purifying treatment, fundamentally the same, results in purification of the still residue, whether or not the sulphonate sludge be recovered. This preferred purification treatment may be described as follows:

A low boiling aliphatic solvent, such as kerosene, V. M. and P. naphtha, Stoddard solvent, ligroin, or gasoline, desirably a petroleum distillate of the gravity and boiling point known as "mineral spirits," is run into a treating tank and is agitated, as by means of a mechanical agitator. The still residue is then run into the tank, and is agitated with the petroleum distillate until a precipitate forms. Desirably, in this step the volume of petroleum distillate is approximately twice the volume of the still residue.

Before the precipitate has a change to coagulate, water is run in, and is agitated with the body of liquid in the tank. This liquid itself contains in solution the aromatic hydrocarbon and resinous contents of the still residue, and the introduction of water by wetting the precipitate prevents its agglomeration. During this stage of the operation the mixture in the treating tank is at normal room temperature, at slightly elevated temperature, or at a temperature somewhat below normal room temperature.

Either in the initial treating tank, or more efficiently after running it into a plurality of settling tanks, the treatment of the mixture is continued. If the mixture is transferred to a plurality of settling tanks, desirably the transfer is made with the introduction of live steam into the mixture, and with agitation; and steaming and agitation may be continued for a short period of time to insure completion of the sludge precipitation, and to prepare the mixture for stratification on settling. The dispersion of live steam through the mixture is desirable for the reason that it speeds up the rate of settling. If more time be allowed, the use of steam may be omitted.

Upon being allowed to settle, stratification takes place in the mixture. The water content, comprising the water initially added and that supplied by condensed steam, if steam be used, floats the solution of still residue in petroleum distillate, to produce well defined stratification. In the water layer there is a settled mass of precipitate.

As the final stage of my preferred separation method, the petroleum distillate solution of still residue is decanted to leave water and sludge in the tank or tanks. The mixture of aromatic and aliphatic liquids with the still residue in solution is then subjected to distillation, first to drive off the aliphatic liquid and the solvent end of the still residue, if any be present, and next to recover a solid resin from the still residue. The distillation for the recovery of solid resin from purified still residue may be identical with the distillation above described as performed upon an unpurified and sulphonate-containing still residue.

The resultant resin is of approximately an 11 to 14 color on the coal-tar resin color scale, and has a melting-point of approximately 100° C. (ball and ring method). It is a coumarone type resin, containing the polymerized reactives commonly found in crude solvent naphtha, but is of a darker color than the resin usually produced by polymerization conducted in crude heavy solvent naphtha, as such, to form a coumarone-indene resin. In connection with the melting-point it should be noted that a melting-point of approximately 100° C. to 110° C. presupposes that substantially all the dipolymer oil content of the still residue has been distilled off from the higher polymers forming the solid resin. This purified resin can, in practical effect, be considered free from sulphonates, and its lighter color is attributable to the fact that the sulphonates, which are susceptible to decomposition during distillation, are removed before the still residue is distilled.

It should be emphasized that, by the purification method above described, I obtain a coumarone-indene resin of high purity. This is shown by the fact that a still residue having the average sulphonate content of about 14% before distillation gives a resin-sulphonate having an ash of about 10. The ash of resin obtained from a thus purified sample of the same still residue is about 0.2%. Further to illustrate this point, if we consider the chief impurities to have the formula R.SO$_3$.Na, where "R" stands for the light oil aromatic, and considering the average molecular weight of the light oil aromatic as 140, the suphonate would then have a molecular weight of 243. On ignition, two molecules of the sulphonate decompose to form one molecule of Na$_2$SO$_4$, which has a molecular weight of 142. The ratio between ash and sulphonate is thus approximately 1:3½. This gives a cross-check on the theory of sulphonates and the relative completeness of sulphonate removal. It should be noted that the resin-sulphonate residuum from the distillation of unpurified still residue is soluble in the aromatic hydrocarbon solvents, showing that its sulphur compounds are organic rather than inorganic.

It is an outstanding characteristic of coumarone type resin as incorporated in a tile binder with a suitable plasticizer, such as oxidized animal, vegetable, or marine pitch, oxidized drying oil or synthetic pitch, which latter I form by oxidizing in admixture still residue of "dipolymer" oil and a drying oil, that the resin has approximately a zero penetration at 115° F. Penetration as herein used is determined by the standard A. S. T. M. method, utilizing a penetrometer with a 200 gram load for 5 seconds at the key temperature of 77° F. and 115° F. The resin recovered from purified still residue being typically a coumarone-indene resin possesses this quality of approximately zero penetration at both 77° F. and 115° F., assuming that the resin has a melting-point at least as high as 90° C.

In utilizing as a component of a tile binder resin of this sort, it is therefore possible to incorporate a high percentage of plasticizer, to give adequate elasticity at 77° F., without imparting to the composition too high a penetration at 115° F.

As noted above, the solid residuum of 100° C. melting-point from unpurified still residue, being a resin-sulphonate mixture, possesses a relatively high penetration (approximately 40 penetration) at 115° F., coupled with a zero penetration at 77° F. This is on the assumption that the solid resinous material is recovered from a still residue of usual composition, comprising sulphonate in sufficient quantity to give a sulphonate content of from 30% to 40% in the solid resinous residuum. As explained above, the use of such resinous material is inadvisable in a binder composition, since its proportional inclusion with one of the suitable plasticizers gives a composition which is either too brittle at 77° F. (if but little plasticizer be used), or which has too high a penetration at 115° F. (if a higher proportion of plasticizer be used). It may be here explained that there are governmental requirements relating to the penetration quality of mastic tile if taken at 77° F. and 115° F. In order to meet these requirements it is necessary that the binder composition have certain penetration qualities at those temperatures, which are approximately 1 to 5 at 77° F., and a penetration not higher than 20 to 35 at 115° F.

From the viewpoint of economy it is desirable to use unpurified still residue to produce a sulphonate-containing resin, rather than wholly to purify the still residue prior to distillation in order to recover a purified coumarone type resin. I have discovered that whereas the sulphonate-containing resin from the usual run of still residue is, as explained, unsatisfactory as the resin component of a tile binder, a substantial sulphonate content in the resin does not render it unusable for that purpose. Thus if we consider an initial sulphonate content of about 14% by weight in the oily, viscous, liquid still residue, I have discovered that a substantial proportion of such still residue may be commingled with a purified still residue before, or during distillation.

To consider the blending of purified and unpurified still residue prior to distillation, I have found that the unpurified still residue may, the sulphonate content being as above described, be mixed with purified still residue in a ratio of from 1 to 1.5 by weight of the unpurified still residue to 2 parts by weight of the purified still residue. As a specific preferred ratio I have found that by commingling 2.5 parts of unpurified still residue and 4.5 parts of purified still residue, giving a blend with a sulphonate content of about 5%, I obtain a resinous product which is satisfactorily usable with a wide range of plasticizers, such as my synthetic pitch, oxidized by-product pitch, or oxidized drying oil carried to a reasonable point of oxidation. In obtaining this blended resin, any suitable distillation procedure, such as the procedure above described, is practiced upon the still residue blend, to recover a sulphonate-containing resin of a lower sulphonate content than that obtained from the usual run of still residue, and having a melting point of from about 90° C. upward.

Conveniently, but not necessarily, the permissible proportion of unpurified still residue may be added to the solution of purified still residue, so that a single distillation serves both for the removal of the aliphatic solvent and the recovery of the resinous residuum.

If a still residue contains less than the usual content of sulphonate, the proportion of unpurified to purified still residue may be increased; and if a still residue of unusually low sulphonate content constitutes the starting material it may be possible to use such still residue without lessening the ratio of sulphonate to coumarone-indene resin in its residual product. Expressing my discovery otherwise, I have found that I may use as the resin component of a tile binder composition coumarone type resin having a sulphonate content up to about 10% to 12%, while obtaining, without utilizing plasticizer material of excessively high gel structure, a binder composition possessing the required penetration resistance at 115° F.

In general connection with the use of a coumarone type resin comprising sulphonates, I have discovered that below a proportion of 10% to 12% sulphonates in the resin, the penetration of the resin at 115° F. is not raised proportionally by the sulphonate content of the resin. A standard coumarone resin, of approximately 95° C. (ball and ring) melting-point, has a penetration of 0 at 77° and 115° F. A resin-sulphonate material obtained by the distillation of unpurified still residue, and having a melting-point of 95° C., while it has a penetration of 0 at 77° F., will have a penetration of approximately 40 to 60 at 115° F. Also a mixture of approximately two parts of resin from purified still residue and one part of resin from unpurified still residue has a penetration of 0 at 77° F., and a penetration at 115° F. of below 5, the penetration at 115° F. not following proportionally the increase in sulphonate content.

The synthetic pitch which has been above noted as an optional plasticizing ingredient of tile binder may be made in accordance with the disclosure of my co-pending application Serial No. 62,045, filed February 3, 1936.

In the former instance a mixture is made from one or more drying oils and the above-described still residue from the treatment of coke-oven light oil; and by blowing an oxygen-containing gas, such as air, through the mixture, the mixture is oxidized to such viscosity that it is a solid at temperatures at least as elevated as normal room temperature. In the latter instance "dipolymer" oil, containing the dimers of the light oil unsaturates, such as coumarone and indene, is similarly mixed with drying oil and the mixture oxidized to form a pitchy product. Both are properly described as oily substances comprising unsaturates occurring in the light oil from the by-product coking of coal.

In making synthetic pitch from either of these initial mixtures, the progress of oxidation is desirably facilitated by gentle heating, and both synthetic pitches are desirably brought to a stage of oxidation represented by a viscosity of 4,000 to 10,000 Saybolt seconds at 210° F., or higher, when the pitch is intended for use as a plasticizing ingredient in a tile binder. In producing pitch of both compositions, the substance having its derivation in the coke-oven light oil serves so to disperse the gel structure of the light oil that a product of high gel structure may conveniently be produced.

While in the specification I have spoken of a certain material commonly found in still residue from the purification of light oil as sulphonates, such substance has not to the best of my knowledge definitely been identified as to its chemical composition, and it may be that a proportion of it may be sulphate additive rather than sulphonate reacted. Since the substance which I term "sulphonate" is defined with respect to its derivation, I do not assume responsibility for the designation of the substance by the term "sulphonates," but intend by it to describe organic salts of sulphuric acid and light oil aromatics, with or without the involvement of other reagent or reagents.

In addition to its use as the resin content of a binder material for mastic tile, linoleum, oil cloth, and the like, the blend of purified and unpurified resin is useful for a number of purposes for which a resin-sulphonate residuum from the distillation of still residue having a sulphonate content of from 30% to 40% is unusable. For example, a completely purified resin should be used for clear varnish stains, which need not then contain organic dyes. Resin having a sulphonate content up to 10% may be used for making waterproof coatings, such as pipe coatings, and the like. From about 10% sulphonate content up to a point at which the sulphonate content causes a paint to lose its gloss, or water-spot, the resin may be used in a paint oil which is to be pigmented. For this latter purpose the resin may contain a sulphonate content approaching 20%, but must not contain as much as the full average sulphonate content of a commercial, unpurified still residue.

The primary thought of the preceding portion of the specification has been the production of a resin-sulphonate material which is particularly useful in mastic tile, and which is in such use combined with a plasticizing material. Emphasis has therefore been placed upon the production of a high-melting resinous residuum, and the distillation described has been of an order producing a high-melting residuum. By discontinuing distillation at a point to leave some of the lower, oily polymers of the light oil unsaturates in the residuum, there is obtained a low-melting resinous product which, if the still residue be unpurified, contains a relatively high percentage of sulphonates. By blending unpurified and purified still residues, and by limiting distillation to obtain a low-melting coumarone-type resin having a limited sulphonate content there is produced a type of resin which I have discovered to be useful for certain purposes.

There is a sort of tile comprising chlorinated rubber as an ingredient, and in which the rubber is of such degree of hardness that it does not of itself plasticize the tile. For this purpose, and in association with the chlorinated rubber, I have discovered that I may use a resin-sulphonate having a melting range of from 10° C. to 40° C. (ball and ring), which contains sulphonates up to about 15% the weight of the resin-sulphonate. In compounding such tile binder attention is directed to plasticity and melting point, but not to penetration. The resin-sulphonate may therefore be included in any proportion to give a product of the desired melting point and degree of plasticity.

Somewhat similar tile containing gilsonite may comprise in its binder composition low-melting coumarone type resin. In such composition, however, only a very low sulphonate content of the resin may be tolerated, and in some grades of that tile no appreciable sulphonate content in the resin is permissible.

I claim as my invention:

1. The herein described method of producing a resin-sulphonate containing coumarone type resin and a sulphonate content within a tolerance of the latter rendering the resinous material suitable for use as a content of tile binders and other purposes which comprises purifying of sulphonates a sulphonate-contaminated still residue resultant from the treatment of light oil derived in the by-product coking of coal, blending such purified still residue with unpurified sulphonate-contaminated still residue of the same origin in a proportion to give a blend having a sulphonate content within a specific tolerance, and by distillation recovering a resin-sulphonate of limited sulphonate content from the still residue blend.

2. The herein described method of producing a resin-sulphonate of coumarone type resin and a sulphonate content within a tolerance of the latter rendering the resinous material suitable for use in a binder composition for mastic tile in association with a plasticizer selected from at least one of oxidized non-mineral pitch oxidized drying oil and a synthetic pitch resultant from the oxidation in admixture of at least one drying oil and an oily substance comprising unsaturates occuring in the light oil from the by-product coking of coal; which comprises purifying of sulphonates a sulphonate-contaminated still residue resultant from the treatment of light oil derived in the by-product coking of coal, blending such purified still residue with unpurified contaminated still residue of the same initial sort in a proportion to give a blend having a sulphonate content not substantially exceeding 5% the weight of the blend, and by distillation recovering a resin-sulphonate having a melting point of from about 90° C. upward and a sulphonate content not substantially exceeding 10% to 12% the weight of the resinous material.

3. The herein described method of producing a resin-sulphonate of limited sulphonate content which comprises the steps of purifying of its contained sulphonates a still residue resultant from the treatment of light oil derived from the by-product coking of coal which consists in precipitating sulphonates from the still residue by agitating the still residue with low boiling aliphatic hydrocarbon and water, injecting live steam into the mixture, stratifying the mixture by settling to form a water layer containing the sulphonates and a hydrocarbon layer containing the other still residue ingredients in solution, separating the layer of still residue solution and the sulphonate containing layer, adding to the thus purified still residue a proportion of unpurified still residue, and by distillation recovering resin containing a proportion of sulphonates less than would result from the distillation of unpurified still residue alone and more than would result from the distillation of purified still residue alone.

4. The herein described method of producing a resin-sulphonate of limited sulphonate content which comprises the steps of purifying of its contained sulphonates a still residue resultant from the treatment of light oil derived from the by-product coking of coal, which consists in precipitating sulphonates from the still residue with low boiling aliphatic hydrocarbon and water, injecting live steam into the mixture, stratifying the mixture by settling to form a water layer containing the sulphonates and a hydrocarbon layer containing the other still residue ingredients in solution, separating the layer of still residue solution and the sulphonate-containing layer, adding to the thus purified still residue a proportion of unpurified still residue, and by distillation to dryness recovering solid resin containing a proportion of sulphonates less than would result from the distillation of unpurified still residue alone and more than would result from the distillation of purified still residue alone.

5. The herein described method of producing a resin-sulphonate of limited sulphonate content which comprises the steps of purifying of its contained sulphonates a still residue resultant from the treatment of light oil derived from the by-product coking of coal which consists in precipitating sulphonates from the still residue by agitating the still residue with low boiling aliphatic hydrocarbon and water, stratifying the mixture by settling to form a water layer containing the sulphonates and a hydrocarbon layer containing the other still residue ingredients in solution, separating the layer of still residue solution and the sulphonate containing layer, adding to the thus purified still residue a proportion of unpurified still residue, and by distillation recovering resin containing a proportion of sulphonates less than would result from the distillation of unpurified still residue alone and more than would result from the distillation of purified still residue alone.

6. The herein described method of producing a resin-sulphonate of limited sulphonate content which comprises the steps of purifying of its contained sulphonates a still residue resultant from the treatment of light oil derived from the by-product coking of coal, which consists in precipitating sulphonates from the still residue with low boiling aliphatic hydrocarbon and water, stratifying the mixture by settling to form a water layer containing the sulphonates and a hydrocarbon layer containing the other still residue solution and the sulphonate-containing layer, adding to the thus purified still residue a proportion of unpurified still residue, and by distillation to dryness recovering solid resin containing a proportion of sulphonates less than would result from the distillation of unpurified still residue alone and more than would result from the distillation of purified still residue alone.

FRANK W. CORKERY.